A. Bristol.
Fly-Trap.
Nº 72446      Patented Dec. 24, 1867
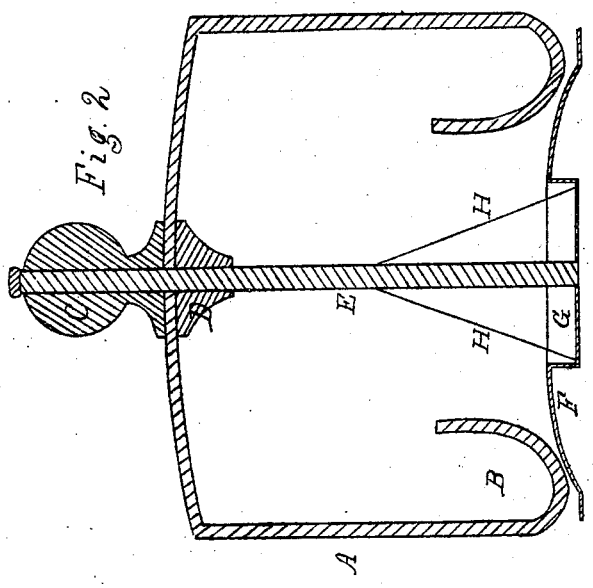
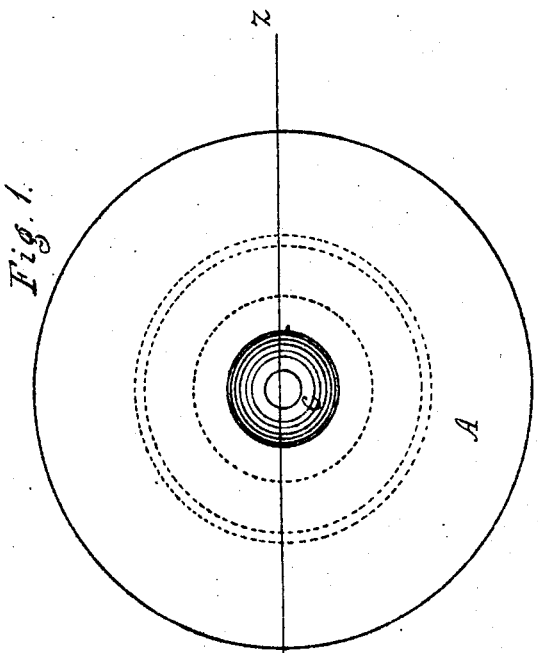
Witnesses         Inventor
Wm Dennis       Almeron Bristol
L. Moore    By his Atty, J. Dennis Jr

United States Patent Office.

ALMERON BRISTOL, OF CONSTANTINE, MICHIGAN.

Letters Patent No. 72,446, dated December 24, 1867.

---

FLY-TRAP.

---

*The Schedule referred to in these Letters Patent and making part of the same.*

---

TO ALL WHOM IT MAY CONCERN:

Be it known that I, ALMERON BRISTOL, of Constantine, St. Joseph's county, State of Michigan, have invented certain new and useful Improvements in Fly-Traps; and I do hereby declare the following description and accompanying drawings are sufficient to enable any person skilled in the art or science to which it most nearly appertains to make and use my said invention or improvements without further invention or experiment.

The nature of my invention and improvements consists in providing a bell-glass or glass cylinder, closed at the top, except an opening for a rod or supporting-standard to pass through, and having at the bottom, on the inside, a trough, formed by turning up the lower edge of the glass, or otherwise, and supported by a rod or standard, with a screw cut on the upper part, and with two nuts, one within and one without the glass, to adjust it to the proper height; said rod or standard having a broad base extending out beneath the trough aforesaid, the central part being formed into or provided with a cup for holding a bait to attract the flies.

In the following description, the accompanying drawings, forming part of this specification, are referred to—

Figure 1 being a plan, and

Figure 2 a section through the centre or the line $z\ z$ on fig. 1.

The bell-glass or cylinder A has an opening through the centre of the top, through which passes the rod E, having a screw cut on the upper part, and two nuts, C and D, the former without and the latter within the glass, for adjusting it to the proper height and securing it on the rod, the nut C serving also as a handle for moving or carrying the trap. The lower edge of the glass turns up inside, and contracts in diameter, so as to form the trough B, to hold soap-suds or other material for destroying the flies. The stand or base, F, and braces H H, support the rod E, and in its central part is formed into or provided with the cup G, for holding sugar, molasses, or other bait to attract the flies.

The trap being placed on a table or other surface, and the glass so adjusted in height as to leave a narrow space between the base and the lower part of the glass, the flies, attracted by the bait, enter beneath the glass, but on attempting to leave, or on being disturbed, they naturally fly upward and outward against the sides of the glass, attempting to escape through which, they descend into the suds and are destroyed.

1. I claim a bell-glass or erect glass cylinder, closed at the top, and having the lower edge turned up inside, to form a trough, as described, and for the purpose specified.

2. And in combination with the bell-glass or cylinder described, I claim the standard, provided with a screw and nuts, to adjust the height of the glass.

ALMERON BRISTOL.

Witnesses:
 JAMES HILL,
 S. C. COFFINBURY.